United States Patent [19]
Brophy et al.

[11] Patent Number: 4,758,375
[45] Date of Patent: Jul. 19, 1988

[54] CONVERSION PROCESS

[75] Inventors: John H. Brophy, Camberley; Clive D. Telford, Sunninghill, both of England

[73] Assignee: The British Petroleum Company p.l.c., London, England

[21] Appl. No.: 70,643

[22] Filed: Jul. 6, 1987

Related U.S. Application Data

[63] Continuation of Ser. No. 727,689, Apr. 26, 1985.

[30] Foreign Application Priority Data

May 2, 1984 [GB] United Kingdom ............... 8411210

[51] Int. Cl.$^4$ .............................................. C01B 3/36
[52] U.S. Cl. .................................................... 252/373
[58] Field of Search ........................................ 252/373

[56] References Cited

U.S. PATENT DOCUMENTS

| | | | |
|---|---|---|---|
| 2,968,683 | 1/1961 | Kossmann | 585/650 |
| 3,119,378 | 1/1964 | Marshall | 122/4 D |
| 3,242,586 | 3/1966 | Peterson | 34/57 A |
| 3,541,179 | 11/1970 | Okagami et al. | 585/541 |
| 4,021,193 | 5/1977 | Waters | 432/58 |
| 4,087,259 | 5/1978 | Fujitani et al. | 252/373 |

FOREIGN PATENT DOCUMENTS

| | | |
|---|---|---|
| 0076704 | 4/1983 | European Pat. Off. |
| 8102057 | 7/1981 | World Int. Prop O. |
| 7902007 | 4/1979 | South Africa |
| 1399137 | 6/1975 | United Kingdom |

OTHER PUBLICATIONS

"Spouted Beds", by K. B. Mathur and N. Epstein, (Academic Press 1974), Chapters 10 and 11, pp. 231–233 and 236–241.
Mathur et al, *Canad. J. Chem. Eng.*, vol. 52, pp. 129–144, (Apr. 1974).

*Primary Examiner*—Howard T. Mars
*Assistant Examiner*—Bruce D. Gray
*Attorney, Agent, or Firm*—Morgan & Finnegan

[57] ABSTRACT

Process for production of synthesis gas in which a saturated hydrocarbon and an oxygen containing gas having a ratio of hydrocarbon to oxygen of greater than the stoichiometric ratio for complete combustion are introduced into a bed of particulate material. The bed comprises material which is catalytically active for partial oxidation and/or steam reforming reactions. The upward flow rate of the hydrocarbon/oxygen containing gas stream is sufficiently large to cause a spouting action of the bed material. The hydrocarbon and oxygen react together and the products of the reaction are withdrawn.

21 Claims, 1 Drawing Sheet

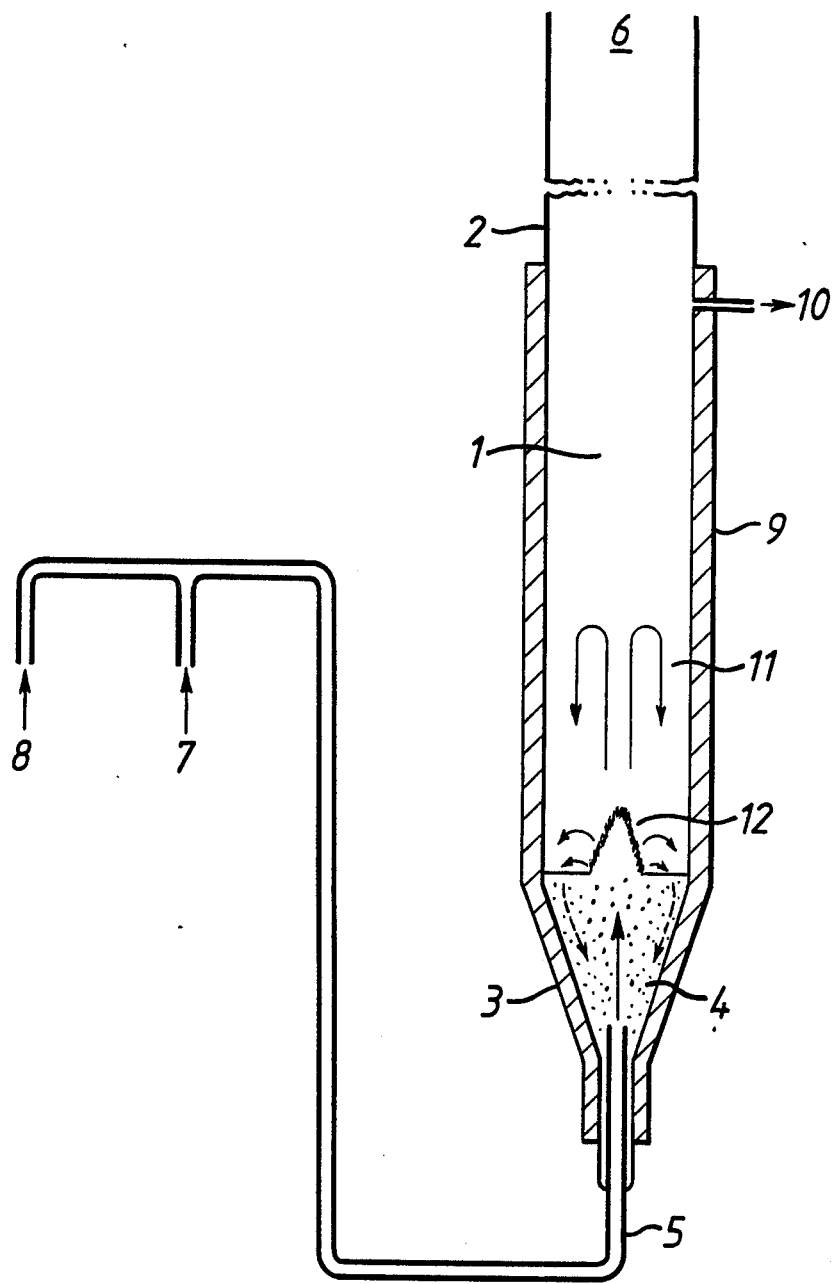

CONVERSION PROCESS

This is a continuation of co-pending application Ser. No. 727,689, filed on Apr. 26, 1985.

The present invention relates to a process for the production of a gaseous mixture principally comprising carbon monoxide and hydrogen (hereinafter referred to as synthesis gas) in a particulate bed reactor.

Catalytic processes for the conversion of synthesis gas into hydrocarbons and/or oxygenated hydrocarbons, such as the (Fischer-Tropsch process) and methanol synthesis, are well-known in the art. The production of synthesis gas for use in these processes is generally accomplished by either steam reforming, autothermal reforming or non-catalytic partial oxidation of light hydrocarbons. All of these processes generally result in synthesis gas in a form which requires considerable intermediate steps prior to conversion into useful products.

Steam reforming is a highly endothermic reaction which is carried out in multitubular reactors with excess steam to prevent carbon build-up on the catalyst. The product synthesis gas has a hydrogen to carbon monoxide ratio of a least 3:1 depending upon the excess steam used, which is higher than the ratio generally required for subsequent conversion into, for example methanol, which requires a ratio of about 2:1. For methanol production, therefore the synthesis gas resulting from steam reforming requires further treatment by way of adjustment of the hydrogen to carbon monoxide ratio.

Non-catalytic partial oxidation is effected in burners specially designed for partial combustion of rich fuel/oxygen mixtures. In order to achieve useful conversions and product gas compositions, however, excess oxygen has to be used, with associated expense in oxygen plant.

Autothermal reforming is a combination of steam-reforming and partial oxidation wherein the heat of reaction for highly endothermic reforming reactions is supplied in part by partial combustion of the feed in oxygen. Excess steam is also necessary in this process to limit coke deposition on the catalyst.

We have now found that the disadvantages associated with the prior art processes can be substantially reduced while at the same time producing synthesis gas requiring minimal intervening processing for conversion into useful products by application of spouted bed technology.

Spouted bed technology comprises passing a high velocity stream of gas vertically upwards through a mass of solid particles. The high velocity gas stream causes the particles to ascend rapidly in a hollowed central spout within the bed. In addition to particle motion within the spout there is particle back mixing in the area surrounding the spout giving a particle circulation pattern in the bed. The feed gas may have sufficient upward flow to create a fountain of particles above the bed or in a deeper bed may give a very high circulation rate of solid particles within the bed. In each case a cycle of solid particle movement is established. A review of developments in spouted bed technology appears in the Canadian Journal of Chemical Engineering, Volume 52, page 129, 1974.

Our UK Patent Application No. 8408804 relates to a conversion process in which fuel rich saturated hydrocarbon/oxygen containing gas mixtures are reacted in a particulate bed reactor to produce synthesis gas and higher hydrocarbons. It has now further been found that catalytic partial oxidation can be achieved by reacting fuel rich saturated hydrocarbon/oxygen containing gas mixtures in a spouted bed reactor, the reactor bed comprising catalytically active particles. The product of the catalytic partial oxidation is synthesis gas which may be used as a feed for further conversion processes, producing for example, methanol and hydrocarbons.

Thus according to the present invention there is provided a process for the production of synthesis gas in which (a) a saturated hydrocarbon and an oxygen containing gas having a ratio of hydrocarbon to oxygen of greater than the stoichiometric ratio for complete combustion are introduced into a bed of particulate material, the bed comprising material which is catalytically active for partial oxidation and/or steam reforming reactions, (b) the upward flow rate of the hydrocarbon/oxygen containing gas stream being sufficiently large to cause a spouting action of the bed material, (c) the hydrocarbon and oxygen reacting together and (d) the products of the reaction being withdrawn.

The hydrocarbon and oxygen containing gas may be pre-mixed before being introduced into the bed through a nozzle. Alternatively the reactant gases may be allowed to mix at the point of injection to the bed.

The saturated hydrocarbon is preferably a gaseous paraffinic hydrocarbon such as substantially pure methane or ethane or mixtures of hydrocarbons comprising substantial proportions of methane and/or ethane, for example those obtained from natural hydrocarbon gas reservoirs which may also contain carbon dioxide. Alternatively, the saturated hydrocarbon may be a liquid hydrocarbon such as liquified petroleum gas. The oxygen containing gas may be for example air or an air/oxygen mixture. Also the oxygen containing gas may be pure oxygen.

The hydrocarbon and/or the oxygen containing gas may be pre-heated, if required prior to introduction to the bed.

The composition of the saturated hydrocarbon/oxygen containing gas will depend upon the nature of the hydrocarbon. The ideal stoichiometry is according to:

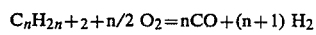

$$C_nH_{2n+2}+n/2\ O_2=nCO+(n+1)\ H_2$$

The preferred ratio of oxygen to hydrocarbon will be some value higher than ideal to satisfy the heat requirements of the reaction and to prevent Boudouard carbon formation according to:

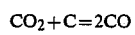

$$CO_2+C=2CO$$

Using a methane feed typically the preferred methane/oxygen molar ratio will be in the range 1.6–1.9.

Commercial reactor systems would probably be operated at pressures above atmospheric and up to 50 bar or even higher.

The particulate material of the bed comprises material which is catalytically active for partial oxidation and/or steam reforming reactions. Suitable catalytically active materials include a metal or metals of Group VIII of the Periodic Table of the Elements deposited on a porous refractory support. Nickel and iron are known catalytically active materials which may be used in the process of the invention. Mixtures of Group VIII metals, optionally containing alkali metal, may also be employed. Porous, particulate, free-flowing catalyst support materials suitable for use in the particulate bed include silica, alumina, silica-alumina, zirconia, titania, hafnia, silicon carbide, boron phosphate, diatomaceous earth and pumice. The particle shape and size distribution must be consistent with the requirements for the spouting action of the bed material. The bed may be diluted with inert temperature resistant refractory materials such as firebrick, quartz, ceramics. The shape of the particulate bed material may be, for example, spherical, or amorphous. The particle size may vary from 0.01 to 10 mm in diameter dependent upon the particle density, the diameter of the reactor and feed inlet and the feed gas flow rate. The particle size distribution is preferably as uniform as possible.

The upward flow rate of the hydrocarbon/oxygen containing gas stream is sufficiently large to cause a spouting action of the bed material. The flow rate of the upward gas stream may cause a fountain of the particulate material to be thrown up above the bed surface. Alternatively, the flow rate may be insufficient to cause a fountain above the bed surface but to give a very high circulation rate of the particulate material within the bed in the form of an internal spouting action.

The materials of construction of the reactor vessel may be for example steel, quartz, carbon fibre or refractory material dependent upon material availability and location and size of the reactor.

The reactor may be insulated to reduce heat loss.

The reaction may be initiated in a number of ways. For example, the particulate material may be pre-heated by igniting and burning a near stoichiometric mixture of a fuel and oxygen containing gas in the bed until the bed temperature is great enough to sustain the partial oxidation reaction. A typical steady state operating bed temperature is of the order 800°–1200° C. without external heating.

The products of the reaction are preferably withdrawn from above the bed and used as a feed for subsequent synthesis processes or separated into the constituents for other applications.

The reactor vessel containing the bed of particulate material may be shaped so as to encourage recirculation of the bed particles in a vertical direction. For a single inlet feed nozzle, the preferred shape of the base portion is conical. The cone angle measured from the vertical is preferably from 10° to 40°.

For the conversion of large quantities of hydrocarbon and oxygen, an array of reactors may be used. The array of reactors may take the form of a plurality of integral units, may comprise a single compartmentalised bed or may comprise a multi spouted bed.

It is also possible if desired to introduce further gaseous or liquid hydrocarbon/oxygen containing gas feeds to the bed through a further nozzle or nozzles. This further feed may have the same composition as the saturated hydrocarbon/oxygen containing gas feed or may be different. The further nozzle or nozzles may direct the further feed in a counter current, parallel, perpendicular or other direction relative to the spouting hydrocarbon/oxygen containing gas feed direction.

It is also possible if desired to introduce carbon dioxide or water (steam) to the bed together with the feed gases or through a separate injection point. This may be used to control the hydrogen/carbon monoxide ratio in the products and reduce carbon formation.

Carbon dioxide may be introduced by recycle of the product gas from subsequent synthesis reactions. This allows efficient utilisation of both carbon and oxygen in an integrated process.

The invention will now be described by way of example only and with reference to the accompanying drawing.

The drawing shows a schematic layout of a particulate bed reactor and ancillary equipment.

The reactor 1 takes the form of an elongated quartz or Inconel column 2 having a conical base portion 3, the angle of the cone from the vertical being 20°. The base portion of the reactor contains a particulate material 4, in the present example, steam reforming catalysts of particle size of the order 0.6–1.2 mm diameter. The base of the column is adapted to receive a nozzle 5 for the introduction of reactants. The nozzle outlet may be adjusted vertically within and above the bed of particulate material. The upper portion 6 of the reactor is open to form an outlet for withdrawal of the product gases. A line 10 enables samples of the products to be withdrawn from the product gas stream.

The nozzle is connectable to a supply of air 7 or other oxygen containing gas under appropriate pressure and to a supply of hydrocarbon 8. A suitable supply may comprise cylinders of hydrocarbon e.g. methane and air linked to the nozzle through a mixer and gas pressure and flow rate measuring devices such as manometers and rotameters (not shown).

The reactor may also have an additional nozzle or nozzles for supplying the hydrocarbon or a further hydrocarbon to the bed (not shown in the drawing). The reactor 1 is lagged with a suitable insulating material 9.

A number of techniques may be used for start up of the reactor. In the present example, the ignition source was a gas burner (not shown) located at the outlet portion 6 of the column.

During start up of the reactor, a pre-mixed gas stream of hydrocarbon and air was passed under pressure to the nozzle 5 in the base portion 3 of the column. The velocity of the gas stream was sufficient to cause a vertical spout or fountain 11 of bed particles in the freeboard above the bed. In the present examples the hydrocarbon feed was methane.

The gas mixture was ignited by the gas burner and a flame stabilised at the exit of the reactor. The air flowrate was increased, bringing the mixture closer to stoichiometric, until the flame began to move slowly back down the reactor. A flame was stabilised at the surface of the bed and the methane flowrate reduced slightly. When the bed temperatures had equilibrated, the methane flowrate was increased and a low flowrate of oxygen was added to the feed. The air flowrate was then reduced and both the methane and the oxygen increased to maintain the stable flame and the spouting action of the bed. This procedure was repeated until the feed composition was entirely methane and oxygen of the desired proportions for the partial oxidation reaction.

The methane/oxygen mole ratio was at least 1.5 in those examples using pure oxygen as the oxygen containing gas. The composition of the products was ascertained by gas chromatography, the principal products being carbon monoxide and hydrogen (synthesis gas).

The experiments were carried out in three reactors, the details of which are shown in Table 1.

Table 2 gives data obtained at atmospheric pressure using various feed compositions, catalytic materials and flow rates in reactor A. The term H/C refers to hydrocarbon products mainly ethylene and acetylene. Only in the comparative example was soot formation observed.

Examples 1, 2, 5, 6 show that the substitution of a steam reforming catalyst for an inert bed (comparative example) results in an increase in conversion of methane with increased selectivity for synthesis gas. Hydrocarbon and soot formation are markedly suppressed in the presence of the catalyst.

Examples 3 and 4 show the production of synthesis gas using air instead of oxygen.

Example 7 shows the production of synthesis gas using a platinum containing catalyst ($Pt/Al_2O_3$).

The analyses of the catalysts are given in Table 3.

Examples 8-10 (Table 4) show the effect of adding carbon dioxide to the feed at atmospheric pressure. The hydrogen/carbon monoxide mole ratio of the product synthesis gas is reduced as additional carbon dioxide is added.

Examples 11-13 (Table 5) show the production of synthesis gas at elevated pressures. In examples 12 and 13, the feed was preheated to achieve the bed temperature indicated.

TABLE 1

| Reactor | Internal Diameter (mm) | Cone Angle (off centre) | Reactor Material | Bed Particle Diameter (mm) | Bed Volume (mls) |
|---|---|---|---|---|---|
| A | 47 | 20° | Quartz | 0.6–1.2 | 60 |
| B | 25 | 20° | Quartz | 0.6–1.2 | 25 |
| C | 47 | 20° | Inconel | 0.6–1.2 | 80 |

TABLE 3

| | % Weight (+ - no analysed) | | | | |
|---|---|---|---|---|---|
| Catalyst | Mg | Ca | Ni | Al | Pt |
| (Steam Reforming) Catalyst 1 | + | 9.2 | 10.4 | 38.4 | + |
| (Steam Reforming) Catalyst 2 | + | + | 11.0 | 47.0 | + |
| (Steam Reforming) Catalyst 3 | 44.0 | 6.0 | 3.1 | 1.1 | + |
| Catalyst 4 | + | + | + | + | 0.78 |

TABLE 2

Data for Various Catalysts at Atmospheric Pressure in Reactor A

| Example | Material | Feed Composition moles % | | | Total Flow l/min | Maximum Bed Temp. °C. | Feed Tube dia. (mm) | $CH_4/O_2$ ratio (molar) | Conversion of $CH_4$ (% mole) |
|---|---|---|---|---|---|---|---|---|---|
| | | $O_2$ | $CH_4$ | $N_2$ | | | | | |
| Comparative Example | Firebrick | 37.6 | 59.7 | 2.6 | 17.2 | 1000 | 2.2 | 1.59 | 76.5 |
| 1 | Catalyst 1 | 36.5 | 60.7 | 2.8 | 17.2 | 785 | 2.2 | 1.66 | 89.4 |
| 2 | Catalyst 1 | 37.0 | 59.9 | 3.1 | 17.2 | 777 | 2.8 | 1.62 | 91.2 |
| 3 | Catalyst 1 | 15.2 | 25.9 | 59.0 | 26.8 | 705 | 2.2 | 1.70 | 66.3 |
| 4 | Catalyst 1 | 16.1 | 22.5 | 61.4 | 21.4 | 714 | 2.2 | 1.39 | 81.2 |
| 5 | Catalyst 2 | 36.5 | 56.5 | 6.9 | 17.2 | 843 | 2.2 | 1.55 | 86.9 |
| 6 | Catalyst 3 | 37.4 | 61.3 | 1.3 | 17.2 | 1019 | 2.2 | 1.64 | 73.0 |
| 7 | Catalyst 4 | 38.9 | 58.3 | 2.7 | 17.2 | 844 | 2.2 | 1.50 | 87.0 |

| Example | Exit dry gas Composition (% mole) | | | | | | Product Gas $H_2/CO$ | % Carbon Molar Selectivity | | |
|---|---|---|---|---|---|---|---|---|---|---|
| | $N_2$ | $H_2$ | CO | $CO_2$ | $CH_4$ | H/C | | H/C | CO | $CO_2$ |
| Comparative Example | 2.6 | 48.1 | 25.1 | 3.3 | 13.6 | 7.2 | 1.91 | 35.7 | 56.8 | 7.5 |
| 1 | 1.6 | 60.4 | 30.1 | 3.4 | 4.4 | 0.04 | 2.02 | 0.4 | 90.4 | 9.2 |
| 2 | 1.7 | 60.3 | 31.6 | 3.0 | 3.3 | — | 1.91 | 0.4 | 91.3 | 8.7 |
| 3 | 53.1 | 23.2 | 11.0 | 4.7 | 8.0 | — | 2.11 | — | 69.8 | 30.2 |
| 4 | 55.6 | 24.1 | 12.2 | 4.3 | 3.8 | — | 1.98 | — | 73.8 | 26.2 |
| 5 | 5.2 | 56.5 | 29.9 | 3.3 | 5.0 | — | 1.89 | — | 90.0 | 10.0 |
| 6 | 1.0 | 54.9 | 27.6 | 4.6 | 11.9 | 0.06 | 1.98 | — | 85.4 | 14.1 |
| 7 | 1.8 | 59.1 | 32.0 | 2.0 | 5.1 | — | 1.85 | — | 94.3 | 5.7 |

TABLE 4

Effect of Addition of Carbon Dioxide to Feed (Reactor B at Atomospheric Pressure)

| Example | Bed Material | Feed composition moles % | | | | Total Flow l/min | Maximum Bed Temp °C. | Feed Tube dia. (mm) | Molar Ratio $CH_4/O_2$ |
|---|---|---|---|---|---|---|---|---|---|
| | | $O_2$ | $CH_4$ | $N_2$ | $CO_2$ | | | | |
| 8 | Catalyst 1 | 35.2 | 61.8 | 3.0 | 0 | 8.1 | 833 | 1.5 | 1.76 |
| 9 | Catalyst 1 | 32.7 | 57.6 | 3.0 | 6.7 | 8.1 | 810 | 1.5 | 1.76 |
| 10 | Catalyst 1 | 29.3 | 51.9 | 2.8 | 16.1 | 8.1 | 794 | 1.5 | 1.77 |

| Example | Conversion of $CH_4$ (% mole) | Exit gas Composition (dry) (% mole) | | | | | Product Gas $H_2/CO$ | % Carbon Molar Selectivity | |
|---|---|---|---|---|---|---|---|---|---|
| | | $N_2$ | $H_2$ | CO | $CO_2$ | $CH_4$ | | CO | $CO_2$ |
| 8 | 95.2 | 1.8 | 63.3 | 31.6 | 1.6 | 1.7 | 2.0 | 95.3 | 4.7 |
| 9 | 95.6 | 1.7 | 57.5 | 34.1 | 4.9 | 1.8 | 1.68 | 87.5 | 12.5 |
| 10 | 94.7 | 2.0 | 53.1 | 34.9 | 7.7 | 2.4 | 1.52 | 82.0 | 18.0 |

TABLE 5

Operation at Elevated Reaction Pressure (Reactor C)

| | Feed | Total | Maximum Bed | Feed $CH_4/O_2$ |

TABLE 5-continued

| | | Operation at Elevated Reaction Pressure (Reactor C) | | | | | | |
|---|---|---|---|---|---|---|---|---|
| | Bed | Composition | | | Flow | Temp | Pressure | Ratio |
| | Material | $O_2$ | $CH_4$ | $N_2$ | l/min | °C. | Bara | Molar |
| 11 | Steam Reforming Catalyst 1 | 37 | 63 | — | 65 | 805 | 4.1 | 1.7 |
| 12 | Steam Reforming Catalyst 1 | 37 | 63 | — | 40 | 948 | 12.0 | 1.7 |
| 13 | Steam Reforming Catalyst 1 | 37 | 63 | — | 40 | 1014 | 24.8 | 1.7 |

| | Conversion of $CH_4$ | Exit gas Composition (dry) (% mole) | | | | | Product Gas | % Carbon Molar Selectivity | | |
|---|---|---|---|---|---|---|---|---|---|---|
| | (% mole) | $N_2$ | $H_2$ | CO | $CO_2$ | $CH_4$ | $H_2/CO$ | CO | $CO_2$ | HC |
| 11 | 87.5 | — | 56.9 | 34.1 | 3.7 | 5.5 | 1.67 | 90.4 | 9.6 | — |
| 12 | 91.8 | — | 62.2 | 31.0 | 4.5 | 3.1 | 2.06 | 86.9 | 12.1 | — |
| 13 | 92.3 | — | 63.3 | 29.9 | 4.1 | 2.8 | 2.12 | 88.1 | 11.9 | — |

We claim:

1. A process for the production of synthesis gas suitable for conversion into hydrocarbons and/or oxygenated hydrocarbons in which (a) a saturated hydrocarbon and an oxygen containing gas having a ratio of hydrocarbon to oxygen of greater than the stoichiometric ratio for complete combustion are introduced into a bed or particulate material, the bed comprising material which is catalytically active for partial oxidation and/or steam reforming reactions, (b) the upward flow rate of the hydrocarbon/oxygen containing gas stream being sufficiently large to cause a spouting action of the bed material, (c) the hydrocarbon and oxygen reacting together and (d) the products of the reaction being withdrawn.

2. A process according to claim 1 in which the catalytically active material comprises a metal or metals of Group VIII of the Periodic Table of the Elements deposited on a porous refractory support.

3. A process according to claim 2 in which the metal or metals is nickel, iron or platinum.

4. A process according to claim 2 in which the catalytically active material comprises a mixture of Group VIII metals deposited on a porous refractory support.

5. A process according to claim 1 in which the catalytically active material also comprises an alkali metal.

6. A process according to any of claims 2 to 5 in which the porous refractory support comprises silica, alumina, silica-alumina, zirconia, titania, hafnia, silicon carbide, boron phosphate, diatomaceous earth or pumice.

7. A process according to claim 1 in which the bed material is diluted with inert temperature resistant refractory material.

8. A process according to claim 7 in which the inert temperature resistant refractory material is firebrick, quartz or a ceramic material.

9. A process according to claim 1 in which the upward flow rate of the hydrocarbon/oxygen containing gas stream is sufficiently large to cause a fountain of the particulate material to be thrown up above the bed surface.

10. A process according to claim 1 in which the upward flow rate of the hydrocarbon/oxygen containing gas stream is sufficient to cause an internal spouting action of the particulate material.

11. A process according to claim 1 in which the saturated hydrocarbon is a gaseous paraffinic hydrocarbon.

12. A process according to claim 11 in which the gaseous paraffinic hydrocarbon is methane, ethane or mixtures of hydrocarbons comprising methane and/or ethane.

13. A process according to claim 1 in which the oxygen containing gas is air, oxygen enriched air or pure oxygen.

14. A process according to claim 1 in which the reaction pressure is above atmospheric pressure.

15. A process according to claim 1 in which the saturated hydrocarbon and oxygen containing gas are premixed at the point of introduction to the bed.

16. A process according to claim 1 in which the saturated hydrocarbon and/or oxygen containing gas are pre-heated prior to introduction to the bed.

17. A process according to claim 1 in which further hydrocarbon is introduced into the bed.

18. A process according to claim 17 in which the further hydrocarbon is different in composition from the saturated hydrocarbon.

19. A process according to claim 1 in which carbon dioxide or water (steam) is introduced into the bed together with the hydrocarbon/oxygen containing gas stream or through a separate injection point.

20. A process according to claim 19 in which the carbon dioxide is introduced by recycle of the product gases from subsequent synthesis reactions.

21. A process according to claim 1 which is carried out in an array of reactors.

* * * * *